May 3, 1960     F. B. PFEIFFER     2,935,117
TIRE BUILDING DRUM
Filed Aug. 28, 1957     3 Sheets-Sheet 1
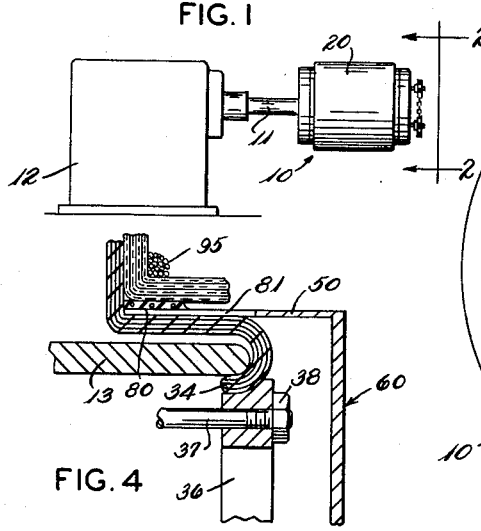
FIG. 1
FIG. 2
FIG. 4
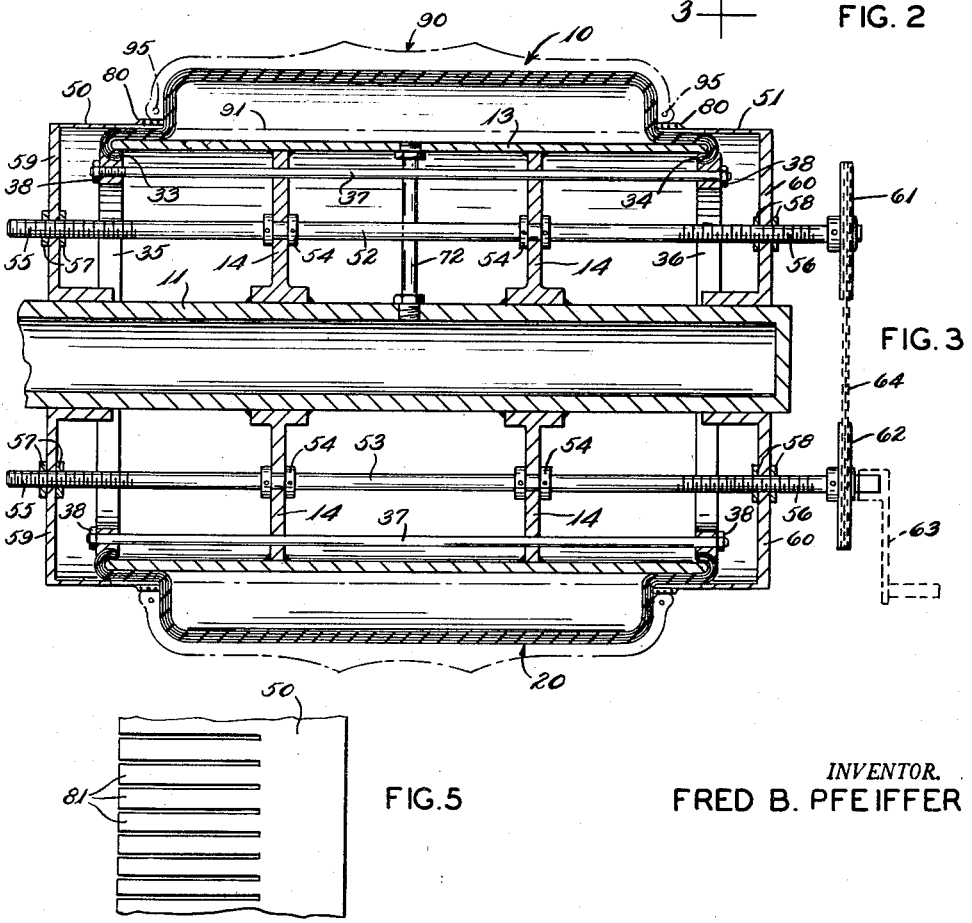
FIG. 3
FIG. 5
INVENTOR.
FRED B. PFEIFFER May 3, 1960 F. B. PFEIFFER 2,935,117
TIRE BUILDING DRUM Filed Aug. 28, 1957 3 Sheets-Sheet 2

*INVENTOR.*
FRED B. PFEIFFER

INVENTOR.
FRED B. PFEIFFER

United States Patent Office 2,935,117
Patented May 3, 1960

2,935,117

TIRE BUILDING DRUM

Fred B. Pfeiffer, Akron, Ohio, assignor of one-half to Jesse R. Crossan

Application August 28, 1957, Serial No. 680,873

6 Claims. (Cl. 154—9)

An object of the present invention is to provide a collapsible tire building drum that collapses into a smooth cylindrical peripheral surface from which a tire, built on said drum, may be easily removed therefrom without danger of injury to the tire.

A further object is to provide a collapsible tire building drum having simple positive means for quickly changing the width of the drum surface on which a tire is to be built.

A still further object is to provide a tire building drum having fluid operated means for pressing tire plies into firm contact with the radially inner surface of the bead elements of a tire.

A principal object of the invention is to provide a tire building drum that is expanded by fluid means and collapsed by elastic means.

Other objects and advantages of the present invention will become apparent, to those familiar with the art, from the following description when read in conjunction with the accompanying drawings, wherein:

Fig. 1 is a side elevation of a tire building machine incorporating the building drum of the invention.

Fig. 2 is a view taken along line 2—2 of Fig. 1.

Fig. 3 is a sectional view taken substantially along line 3—3 of Fig. 2.

Fig. 4 is an enlarged fragmentary sectional view showing the bead setting ring in operation.

Fig. 5 is an enlarged fragmentary plan view of the bead setting ring.

Figure 6:
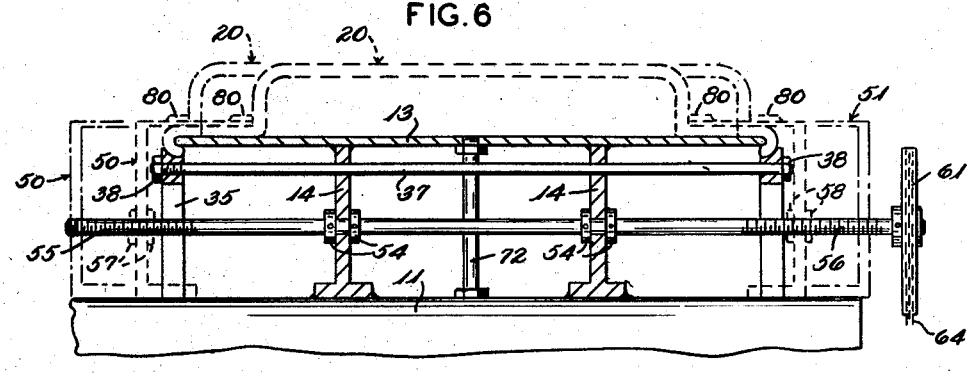
Fig. 6 is a fragmentary diagrammatic view showing widthwise adjustability of the building drum, the outermost being indicated by dot-dash lines and the innermost by dotted lines.

Referring to the drawings and particularly to Figure 1 thereof, the apparatus of the present invention broadly includes a building drum assembly generically referred to as 10 which assembly is supported on and driven by a hollow closed end shaft 11 extending from a housing 12 in which is located a motor (not shown) for driving the shaft and drum. Braking means, of any type found satisfactory, may be attached to the shaft 11, however, since braking means do not constitute a part of the invention a detailed description of same is not necessary for a full disclosure of the present invention and its operation. A rigid non-collapsible cylindrical inner drum 13 is concentrically mounted on shaft 11 by means of spokes 14 which spokes may be attached to the shaft 11 and drum 13 by any satisfactory means as, for example, by welding.

An inflatable outer drum, referred to generally as 20, is removably mounted on the inner drum 13 radially outwardly thereof and with the edges of said inner and outer drums in airtight relation, as will be explained later herein.

Outer drum 20 comprises an outer layer of elastic material 30, an inner layer of elastic material 32 and a strain member layer 31 the latter being sandwiched between layers 30 and 32. Layers 30, 31 and 32 may be adhered to each other to form a composite body or layers 31 and 32 may be permanently joined together, as by cementing, vulcanizing or otherwise, and layer 30 be removably superimposed relative to adhered layers 31 and 32. Applicant has elected to illustrate the present invention in connection with said layers 30, 31 and 32 but it is to be understood that the invention is not to be so limited and that any number of said layers having the required functional characteristics and in any combination is within the contemplation of the present invention.

The axial length of outer drum 20 relative to inner drum 13 is such as to permit the edges of the outer drum to be turned around and under the edges of the inner drum as illustrated in Figs. 3 and 4. The turned under edges 33 and 34 of drum 20 are anchored in airtight contact relative to the edge portions of drum 13 by rings 35 and 36, respectively. Rings 35 and 36 are drawn firmly against the edges of the outer drum by means of cross-bars 37 and nuts 38 as will also be understood by reference to Figs. 3 and 4.

Layers 30 and 32 are composed of rubbery or other elastic material and for the purpose of illustration, but without limitation, a method of fabricating drum 20 will now be explained:

First two bands B composed of rubber or rubbery material, of a diameter and axial length, to fit snugly over drum 13, is provided. A thickness of ⅛" has been found satisfactory for each of these bands although they may be of any thickness found to be satisfactory and they may be made in any manner, as by winding a sheet of unvulcanized rubber, of proper width, about a drum of proper diameter, until the desired thickness is obtained, and then the drum, with the rubber or rubbery material thereon, being placed in a vulcanizer and the rubber vulcanized by an open steam method to produce a band B illustrated in Fig. 7. Because band B is stretchable and elastic applicant has found that similar or the same size bond can be used for both layers 30 and 32, but obviously the thickness and width of bands B may be different for said separate layers 30 and 32 as could their diameters.

Figure 8:
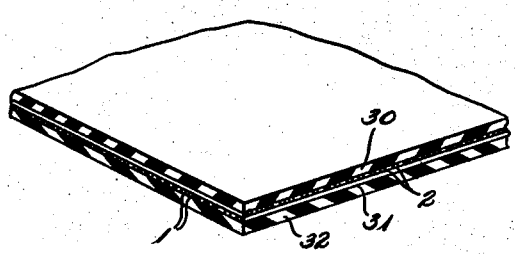
Fig. 8 is an enlarged fragmentary sectional perspective view of the construction of the pneumatic inflatable member of the drum.

Layers 30, 31 and 32 are preferably first assembled on a collapsible building drum of any type having a building surface of proper width and diameter. Examples of such collapsible drums are shown in United States Patents 2,514,215 and 2,717,628. The diameter of said building surface is such that when layers 30, 31 and 32 are plied up thereon the outside diameter of the assembled plies will equal the outside diameter of inflated outside drum 20, which in the present illustration, is 2" greater than the outside diameter of drum 13. Layers 30, 31 and 32 are assembled as follows:

With a collapsible building drum in collapsed condition a first band B is slid onto the drum over an end thereof and then the drum expanded, to its predetermined diameter, stretching said first band tightly thereabout. Next, while the drum is so expanded, a thin layer of non-extensible material is laid over, or plied-up on, said first band B to form layer 31. Layer 31 is preferably composed of a sheet of two plies of nylon cord fabric as illustrated in Figure 8, wherein cord 1 extends circumferentially of the drum and is applied to said stretched first-band by winding cord 1 spirally therearound over the width of said first band thus forming the first ply of layer 31. Cord 1 may be covered with a tacky coat of cement or a thin coat of rubber if desired. The second ply of sheet 31 comprises cords 2 which extend across layer 31 at substantially right angles to cord 1. Cords 2 may be coated with a thin coat of rubber and primarily function to retain spiral wound cord 1 in its original wound position. Next a second band B is stretched and slid onto built up layer 31 without disturbing the latter, it being understood that suitable means for stretching the second band for application over layer 31 on the expanded drum is employed. Such means may be any of several well known means in the tire building industry, as for example, by the use of a roller bar of a type used by tire builders to apply band plies to tire building drums. The edges of layers 30, 31 and 32 are aligned on the drum on which they have been assembled and after these layers have been so assembled the drum is collapsed and said assembled layers removed as a unit forming the body portion of ouside drum 20.

When the layers of body 20 are removed from the collapsible drum the first band forming layer 30 and the second band forming layer 32 will draw back to their molded unstretched diameter, shrinking and, if necessary, also wrinkling, into numerous small wrinkles, layer 31. The composite cylindrical assembly of layers 30, 31 and 32 is now applied to said inside drum 13, it being understood, as indicated hereinbefore, the said assembly fits snugly on drum 13. Next the edges of the assembled layers are turned down over and under the edges of drum 13 and locking rings 35 and 36 bolted into firm contact with said turned edges. By reference to Figures 3 and 4 it will be seen that cross members 37 are in the form of stud bolts passing through bolt holes 3 in rings 35 and 36. Nuts 38 are tightened on thread ends of members 37 to draw said rings into tight contact with said turned edges. The peripheral edge portions of rings 35 and 36 have an outside diameter substantially equal to the inside diameter of drum 13 and said peripheral edge portion has an axially and inwardly curved surface adapted to contact said turned edges and to clamp same against the edges and inside surface of drum 13 to form anchorage of the outer drum 20 on drum 13 in fluid tight contact therewith.

Tire bead setting rings 50, 51 are carried in adjustable relation on rotatable rods 52 and 53 as best shown in Figures 2 and 3. Rods 52 and 53 are supported in bearings 54 disposed in holes in spokes 14 and have oppositely threaded ends 55 and 56 that in turn are in threaded relation with nuts 57 and 58, respectively, attached to spokes 59 and 60 of bead setting ring 50. Sprocket wheels 61 and 62 are mounted on the outboard ends of rods 52 and 53, respectively, for rotating these rods to actuate rings 50 and 51 toward or away from each other, according to the direction of rotation, of said rods. To this end rod 53 has a squared end and a handle 63 attached to sprocket wheel 62 mounted on the end thereof. A sprocket chain 64 is in driving relation with sprockets 61 and 62. Rings 50 and 51 have flexible axially inwardly extending fingers 81 whose unexpanded diameter is approximately equal to the outside diameter of drum 13 plus twice the thickness of layers 30, 31 and 32, of drum 20, so, as shown diagrammatically in Figure 6, the finger edges of bead setting rings 50 and 51 may be pressed over the edges of drum 20, against drum 13, to change the area of the building surface of drum 20, as may be desired for building the same or different size tires, on drum 20. The area of exposed surface and width of drum 20 may be changed by manually turning handle 63 which will revolve rods 52 and 53 in nuts 57 and 58 in rings 50 and 51, respectively, thereby moving these latter rings toward or away from each other according to the direction of rotation of said handle.

Means for fluid expansion of drum 20 comprises the hollow shaft 11 which is connected to a source of air pressure by means of a rotating sealed connecting joint or packed gland, not shown, but will be readily understood by those familiar with such art. A fluid connecting line 72 extends from shaft 11 through drum 13 and opens under the inner surface of drum 20 as will be seen by reference to Figures 3 and 6.

To provide more continuous contact of the bead setting rings with the plies of a tire, and to provide more resistance of the expansion of said fingers during the initial inflation of drum 20, an elastic strain band 80 is stretched and mounted, on the axially inner ends of fingers 81. The width of band 80 is as wide as the width of the tire-bead portion of a tire being built as will be seen by reference to Figure 3. This latter band comprises a body portion of vulcanized rubber with a spirally wound cord or other material embedded therein. The diameter of bands 80 relative to that of rings 50 and 51 are such that they will prevent the expansion of fingers 81 when the fingers are pressed over the edges of drum 20 and when drum 20 is expanded, for application of tire fabricating material to the crown thereof, but will stretch sufficient to permit said fingers to temporarily expand under the influence of higher fluid pressure which may be applied to expand said fingers 81 and band 80 radially outwardly against tire plies to press the plies against the inextensible portion of the bead portion of a tire being built on drum 10 as illustrated by Fig. 4.

Figure 9:
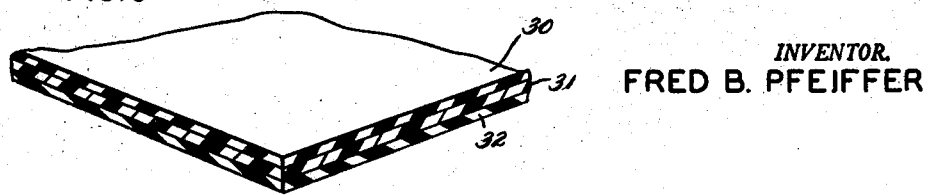
Fig. 9 is a modification of Fig. 8.

Referring now to Figure 9, there is shown a modification of layer 31 described in reference to Figure 8. In Figure 9 a layer of material, for example, such as "Mylar" now commercially available is substituted for cords 1 and 2, of Figure 8. Preferably this substituted material, whether "Mylar" or other material, has such tensile strength that a thickness of as little as 1/32" is sufficient for layer 31. Applicant prefers to use "Mylar" or other substantially inextensible material in a strip of proper width and of about .001" thick by winding it about layer 30 on said inner band B, on the said expanded building drum on which drum 20, is being built, as explained hereinabove, until a thickness of about 1/32" is obtained when the loose ends may be cemented or otherwise permanently attached to the next preceding round of material. Any undesirable stretch in said "Mylar," or material being used for layer 31, may be removed by stretching it when applying over layer 30.

In applying layer 31, regardless of whether or not it is of material specifically set out herein, it is to be understood that it is built into drum 20 at the maximum diameter to which it can be forced by expanding drum 20. In other words, layer 31 determines the maximum outside diameter over the building surface of drum 20.

In building a tire on drum 10 the operational steps are substantially conventional and broadly are as follows:

With the completion of building a tire 90, on inflated drum 20, as shown in Figure 3, the said air passage is opened to the atmosphere through suitable valve means not shown, at which time stretched rubber layers 30 and 32, due to their elastic characteristic, returns to their originally vulcanized diameters with strain member layer 31 gripped between them. This results in pulling drum 20 radially inwardly from tire 90 and pressing the drum 20 snugly about drum 13 as shown by dot-dash line 91 in Figure 3. This leaves tire 90 free to be removed from drum 10 off the outboard side thereof. Because the entire inner and outer radial surfaces of layer 31 is continuously contacted by and gripped by the decreasing surfaces of layers 30 and 32 layer 31 is shrunk uniformly without localized wrinkles and, if textile cords are used, as explained in reference to Figure 8, without wrinkling layer 31. If a strain member layer 31 such as explained in reference to Figure 9 is used, then, if layer 31 wrinkles, such wrinkles as are formed are numerous, evenly distributed and small so that the thickness of the crown portion of drum 20 is not substantially increased, and in any event, not increased in thickness, to an extent, to affect the free removal of tire 90, from the drum.

With the tire 90 removed from drum 20 the drum is reinflated at which time its crown portion will expand to the circumference permitted and controlled by strain layer 31 and to the width controlled by the spacing of rings 50 and 51 namely, to the contour and dimensions of drum 20 shown in Figure 3. The internal air pressure of drum 20 may be controlled automatically by proper valving and the contour of the drum may be checked by templates, gauges, caliper, etc. The diameter of drum 20, when inflated, is controlled by the circumferential length of layer 31 as initially built into drum 20. Obviously the construction of drum 10 lends itself to numerous types of controls and manipulation without departing from spirit of the invention.

With drum 20 inflated the first ply of a tire to be built is applied to drum 20 in a conventional manner of fabricating drum built tires. The successive ply or plies that are to be disposed under the inextensible portions 95 of the tire beads are next applied, after which said tire beads 95 are "set" in position, over said plies, as illustrated in Figure 4. An important feature of the invention resides in the relative internal pressure of the drum required to expand the crown portion of drum 20 to its maximum diameter and sufficiently solid for stitching tire materials thereon and the addiitonal internal pressure to expand ring fingers 81 with band 80 mounted thereon. These relative internal pressures are, for illustration, but without limitation, ten pounds and 15 pounds. That is, ten pounds internal pressure expands the drum to its maximum crown circumference but it is not enough pressure to raise the fingers 81 and band 80 radially outwardly from drum 13, however, if the internal pressure is raised to fifteen pounds fingers 81 and band 80 are expanded. It is to be understood however, that these quoted pressures are for the purpose of illustration only. Pressing the tire plies that are turned under the beads firmly against the radially inner surface of the inextensible beads, such as 95, has been an industry problem for which the present invention provides a solution by the simple step of increasing the internal air pressure in drum 20, whereby, the wall of drum 20, under fingers 81 and band 80, are forced radially outwardly expanding said fingers and band 80, the band 80 pressing the plies, under beads 95, firmly against same.

Figure 10:
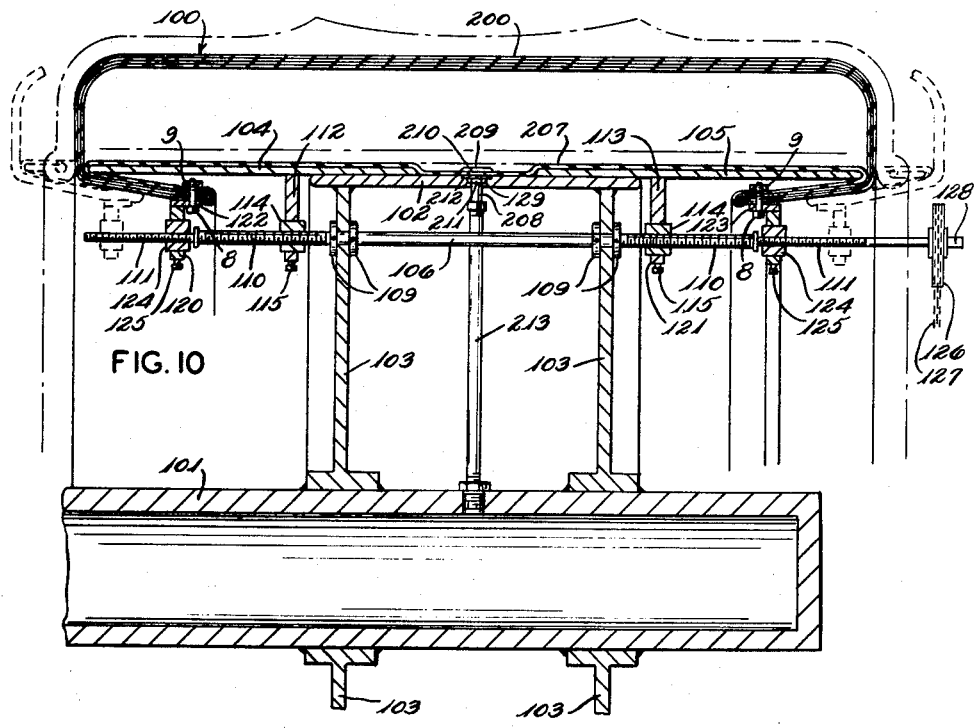
Fig. 10 is similar to Fig. 3 but showing another embodiment of the invention.
Figure 11:
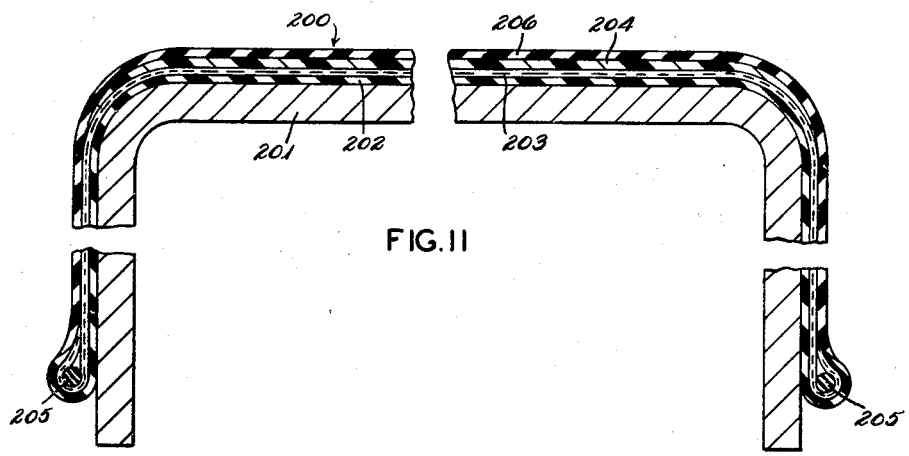
Fig. 11 is a sectional view of the inflatable drum of Fig. 10 shown on its building drum.

The embodiment of the invention described hereinabove is particularly adapted for building four or less ply tires. The embodiment shown in Figures 10 and 11 is especially adapted for adjustment of width of the drum over a large range and to permit tire plies to be conveniently turned under and around the beads during the tire building operation as is sometimes required for large size tires. Referring now to Fig. 10 it will be seen that a drum referred to generically as 100 comprises a driven hollow closed end shaft 101 on which a base 102 is mounted by spokes 103. Telescoped on base 102 are rings 104 and 105. Means for actuating said rings in their telescopic relation with base 102 comprises rotatable threaded rods 106. The threaded rods are supported in bearings 109 in spokes 103 as will be seen by reference to Fig. 10. Said rods have oppositely threaded end portions and each threaded end has a first portion with threads 110 which are half as many threads to the inch as the threads 111 on the next portion toward the end of the rods. Permanently attached to inner side of rings 104 and 105 and concentric therewith are rings 112 and 113 respectively. Nuts 114 are removably mounted in suitable holes in rings 112 and 113. Nuts 114 are in threaded relation with threads 110 and are held in position in rings 112 and 113 by set screws 115. Rings 120, 121 having flanges 122, 123 respectively, are carried on the end of rods 106 by means of nuts 124 on threads 111. Nuts 124 are removably supported in holes in rings 120, 121, by set screws 125, in similar manner as nuts 114 are retained in rings 112 and 113. Means for rotating rods 106 comprise sprockets 126 mounted on rods 106 and driven by chain 127 which in turn is driven by means of hand crank 63 removably fitted on squared end 128, of a rod 106, in the manner illustrated in Figure 3. An inflating stem hole 129 is provided through base 102 for a purpose explained later herein.

An inflatable and collapsible drum referred to generally as 200 is mounted on drum 100 and has substantially the same functional characteristics as inflatable and collapsible drum 20 shown in Fig. 3. However, because of the modification of the width-wise adjustment of drum 200 it is built and constructed as will now be explained:

Drum 200 is built on a collapsible drum such as used to build drum 20 but of a modified sectional contour. First a strip 202 of rubber is laid over drum 201 and its ends spliced in the usual manner of assembling tire plies to tire building drums in tire fabrication. Next a ply of zero-angle rubberized cord fabric 203 is applied over strip 202 and then a strip 204 of inextensible material is applied over strip 203 completely across the crown width and over shoulders at least a short distance. It is to be understood that the substantially cylindrical surface of 204 in the assembly on drum 201 determines the outside diameter of inflated drum 200 when the latter is inflated and a tire built thereon when drum 200 is used in service. Extensible bead grommets 205 are set, in the manner of setting pneumatic automobile tire beads, against the ply 203 after which the radially inner edges of ply 203 and strip 202 are turned together about said grommets as will be seen by reference to Fig. 11. An outside layer of rubber 206 is applied over the outer surface of the assembled layers 202, 203 and 204 and then drum 201 is collapsed and the assembly removed to be molded and vulcanized to the same shape it was assembled on drum 201 and in the same manner as automobile tires are molded and vulcanized.

Since drum 200 as molded has an open belly and drum 100 has telescoped members a closure member 207 in the form of a rubber base is provided. By reference to Fig. 10 it will be seen that rubber base 207 extends across and in continuous contact with the radially outer surface of drum 100 and in separable contact with layer 202 of drum 200 from inner edges of drum 200 to the lateral edges of movable rings 104 and 105 of drum 100. It is to be understood that if found desirable to promote air seal that the edges of rubber base 207 may be cemented, vulcanized or otherwise adhered in air tight relation to the edge of layer 202 but not beyond a point that may pass around the lateral edges of rings 104, 105 as will be understood as the description proceeds. An inflating stem 208 is attached to base 207 in similar manner as valve stems are attached to tire inner tubes, the stem having a head portion 209, a threaded portion 210 to receive nut 211 and a washer 212 by which head 209 may be drawn against rubber base 207 creating an air tight seal between the stem and base 207. An air line 213 is connected to inflating stem 208 and communicates with the inside of hollow shaft 101 through which inflationary air is suplied as through shaft 11 of Fig. 3.

Preparatory to mounting drum 200 on drum 100 telescoping members 104 and 105 may be temporarily removed from the assembly and nuts 114 run on threads 110 of rods 106 to a predetermined position. Next members 104 and 105 are replaced with nuts 114 disposed in said holes in rings 112 and 113 where are are retained by set screws 115. Then nuts 124 are run on threads to a predetermined position relative to nuts 114 and the lateral edges of rings 104 and 105. Drum 200 is now applied to drum 100 by buttoning an edge of drum 200 over the radially outer surface of drum 100 permitting rubber base 207 to rest on drum 100 and the radially inner edges of drum 200 to extend radially inwardly of telescoping rings 104 and 105. Rings 120 and 121 are next placed in position with flanges 122 and 123 turned axially inwardly and carrying the edges of drum 200 ahead of and in contact with said flanges. A ring 9 with circumferentially spaced internally threaded holes to receive lag screws 8 is slid over the edges of drum 200 sandwiching these edges between it and flanges 122 and 123. The flanges have bolt holes corresponding to said bolt holes in ring 9 and screws 8 pass through said sandwiched edges and are in threaded relation with the threads in the holes of ring 9 thereby bolting ring 9 firmly in position relative to said flanges whereby the edges of drum 200 are anchored on flanges 122 and 123. Obvious other ways of anchoring drum 200 to rings 120 and 121 will occur to those familiar with the art without departing from the spirit of the invention.

Figure 7:
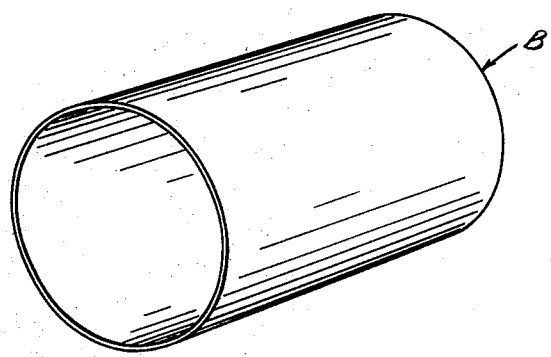
Fig. 7 is a perspective view of an annular elastic drum-collapsing member shown as it appears before its assembly with other elements of the drum.

In this embodiment of the invention applicant prefers to use detachable collapsing means in the form of band B shown in Fig. 7. In this form the band B is formed of high grade rubber and is ¼" thick, more or less, and of a width to cover the crown and shoulders of inflated drum 200. In this latter case band B is molded and vulcanized to an inside diameter no greater than the outside diameter of drum 100. It is to be understood that as drums 100 and 200 are manipulated, as explained below to provide different drum widths that bands B of different widths may be required to accommodate such adjustment of widths.

The operation of the embodiment of the invention shown in Figs. 10 and 11 is as follows:

With drum 200 deflated and collapsed as indicated by dotted lines Fig. 10 the band B is disposed over the center of the inflatable drum, which may be readily done due to the stretchability of band B and its diameter being only somewhat smaller than the outside diameter of collapsed drum 200. If found desirable a vacuum line may be connected into line 213 to facilitate collapsing of the drum. After band B is disposed as just explained the assembly is in operative form ready to be inflated to its maximum expanded form. Applicant has found that approximately five pounds inflationary pressure satisfactory although considerable more pressure may be used if desired. During inflation drum 200 will expand radially outwardly until the inextensible layer 204 reaches its molded circumferential length at which time layer 204 takes radial load and the zero-angle cords of layer 203 provides the strain member which determines the lateral expansion of the sides of the inflated drum. Because of the greater surface area of the crown portion of the tire than the area of the sides the latter are drawn into substantially radial walls and snugly against the lateral edges of rings 104 and 105 which provides an air seal between rubber base 207 and layer 202 adjacent the edges of rings 104 and 105. With drum 200 and its band B so inflated and expanded it provides a collapsible tire building drum on which the components of tires may be assembled in conventional manner. After a tire has been so assembled the drum is collapsed by opening air line 213 to the atmosphere through suitable valving as explained relative to the drum 20 of Fig. 3. Upon deflation of drum 200 elastic band B forces the drum into collapsed condition when the assembled tire may be removed from the drum without encountering any obstruction. If the expanded width is to be increased or decreased either for different size tires or only slightly to modify the distance between the beads of tires to be built the hand crank 63 is applied to the squared end of a rod 106 and turned clockwise or counter-clockwise according to whether the drum 200 is to be widened or narrowed. The rotation of a rod 106 drives the sprocket chain on sprockets 103 which synchronizes the rotation of said rods and causes nuts 114 and 124, and their associated rings 112 and 120 respectively, to move axially of said rods according to the direction of rotation. Regardless of the direction of rotation of the rods nuts 114 and 124 move in the same direction, on the same side of the drum, with nuts 114 in threaded relation with said 20 threads to the inch portion of said rods traveling twice as far as nuts 124 which are in threaded relation to the 10 threads to the inch portion of said rods. It will now be seen that since the opposite ends of the rods have opposite threads that rings 104 and 105 will be simultaneously moved toward or away from each other depending on the direction of rotation of said rods. When drum 100 is widened as explained above drum 200 is widened an equal amount. Because the rubber base layer 207 of drum 200 lies on both sides of rings 104 and 105 when these latter rings are moved telescopically relative drum base 102 ring 120 must move the edges of drum 200 they anchor twice as far which they do as explained above.

It will now be seen that the present invention provides a tire building drum that is inexpensive relatively to cost of prior drums. It will further be seen that the invention provides a drum construction that solves the industry problem of getting tires off all metal drums for tires having 14" and 13" bead diameters and at the other extreme the present invention makes possible a building drum for giant low production tires at a relatively low cost compared to the present cost of, for example, approximately twenty-five hundred dollars, for a drum for a 30" tire.

The detailed description of the particular embodiments of the invention illustrated and described herein is not to be construed as limiting the invention thereto. The invention includes all features of patentable novelty residing in the foregoing description and the accompanying drawings.

I claim:

1. A rotary tire building drum comprising a driven hollow shaft upon which the drum is mounted and by which the drum is driven, a rotatable rigid cylindrical member mounted on and being fixedly attached to said shaft by spokes; a fluid expandable outer drum portion mounted on said rigid cylindrical portion in removable fluid tight relation therewith, said outer drum portion comprising a plurality of superimposed layers of body material including an inner layer of the form of an endless stretchable elastic band adapted to fit snugly about the radially outer surface of said rigid member when the outer drum is not expanded, a non-elastic inextensible cylindrical thin band having a predetermined stretch limit about said inner layer, said thin band having a circumferential length substantially greater than the initial circumferential length of said inner layer and being adapted to establish the outer diameter of said tire building drum when the latter is expanded; an outer layer of elastic rubber disposed about said inextensible layer, said outer layer having a circumferential unstretched length of approximately the same length as that of said inner layer when the latter is unstretched, said inner layer having a width greater than said rigid member and having its edge portions in fluid-tight contact with the edge portions of the rigid member; a fluid passageway communicating through the wall of the rigid member to its radially outer surface for discharging drum expanding fluid between said rigid member and said inner layer whereby said inner and outer layers are stretched and said inextensible layer is placed under stress and the outer drum portion is expanded to a predetermined diameter by the fluid medium and said drum is collapsed by the said stretched outer layer; tire outer drum width adjusting means comprising a pair of rings, each ring being mounted in threaded relation with at least one rod having reversed threads thereon and extending axially through the drum, means for rotating said rod whereby the rings may be moved axially inwardly or outerwardly of the drum, the axially inner edge of said rings terminating in closely spaced fingers which overlie the edges of the inflatable outer drum pressing the wall thereof against the radially outer surface of said rigid member over an area determined by the axial movement of said rings, said finger portions of said rings being formed of resilient material and expandable, an endless elastic band removably disposed snugly about said fingers of each said ring whereby additional resistance to expansion of said fingers is provided.

2. A rotatable tire building form comprising in combination a non-collapsible inner drum and a collapsible and expandable outer drum; said outer drum being concentrically mounted on the inner drum in fluid tight relation therewith, said inner drum being mounted on and rotated by a driven shaft, said outer drum comprising a plurality of superimposed layers of body material including a flexible non-elastic inextensible thin cylindrical band; said band having a predetermined width and circumferential length; at least one said layer being composed of elastic material and having a normal circumferential length of approximately the circumferential length of the inner drum; said cylindrical band having a circumferential length substantially greater than that of the inner drum; means for subjecting the outer drum to internal fluid pressure and expanding same during a tire building operation of the said form; said predetermined dimensions of the inextensible band being subjected to radially outwardly exerted pressure during expansion of the outer drum whereby the inextensible band takes its cylindrical form and establishes such contour to the crown portion of the outer drum; means for modifying the width of the outer drum comprising cross-rods mounted on and extending axially through said inner drum, opposite ends of said rods being provided with reversed threads on each of which are mounted in threaded relation a ring, said rings being in contact with the sides of the outer drum adjacent the outer surface of the inner drum, means for rotating said rods whereby said rings are concurrently drawn axially toward or away from each other whereby the width of the outer drum between said rings may be changed.

3. A rotary building form comprising a rotatable hub shaft, a rigid non-collapsible inner drum mounted concentrically on said shaft in driven relation therewith; an expandable and collapsible outer drum mounted on said rigid drum and having a predetermined contour when expanded; fluid means for expanding and elastic means for collapsing the outer drum, said outer drum having a wall comprising a radially outer layer of elastic material whose circumferential length in its unstretched condition is approximately the same as the circumferential length of said inner drum, said wall further comprising a layer of inextensible flexible material integral therewith and disposed inwardly of said layer of elastic material, said inextensible layer in its expanded shape having a contour substantially the same as the predetermined contour of the outer drum, whereby the inextensible layer in expanded condition establishes said predetermined contour of the outer drum and the elastic layer collapses the inner drum when the latter is not subjected to fluid pressure.

4. A rotatable tire building drum comprising in combination a non-collapsible inner drum and a fluid expandable outer drum; the outer drum being concentrically mounted on the inner drum; said outer drum comprising a wall including an inner and an outer layer of rubbery-like material having a circumferential length in their unstretched condition that is substantially the same as the outer circumferential length of the inner drum, said inner drum having an intermediate layer of flexible inextensible material sandwiched between said outer and inner layer, said intermediate layer in its maximum expanded form having substantially the contour of the inflated tire building drum.

5. A fluid expandable rotatable tire building drum comprising in combination, a non-collapsible inner drum and a collapsible and fluid expandable outer drum mounted on the inner drum radially outwardly of and concentrically therewith; said outer drum having a body with a wall comprising superimposed layers, said wall being fluid tight; said layers including an outer layer of elastic material having a circumferential length, in its unstretched condition, no greater than the circumferential length of said inner drum; another said layer being disposed radially inwardly of the outer layer and being composed of flexible inextensible material that, in its expanded state when said inner drum is fluid expanded preparatory to building a tire thereon, approximately the contour of the expanded tire building drum, whereby said inextensible layer establishes the contour of the building drum and the outer layer retracts and collapses the outer drum when the latter is not subjected to internal fluid pressure.

6. A fluid expandable rotatable tire building drum comprising in combination, a non-collapsible inner drum and a collapsible and fluid expandable outer drum mounted on and about the inner drum; the outer drum having a wall comprising superimposed layers, said wall being fluid tight; said layers including an outer layer of elastic material having a circumferential length, in its unstretched condition, that is no greater than the circumferential length of the inner drum; another of said layers being disposed radially inwardly of the outer layer and being composed of flexible inextensible material that, in its maximum expanded state, has approximately the contour of the tire building drum when the latter drum is fully expanded preparatory to building a tire thereon.

References Cited in the file of this patent

UNITED STATES PATENTS

| 2,084,009 | Sohl | June 15, 1937 |
| 2,161,117 | Wikle | June 6, 1939 |
| 2,182,176 | Maranville | Dec. 5, 1939 |
| 2,600,291 | Engler | June 10, 1952 |
| 2,614,951 | Iredell | Oct. 21, 1952 |
| 2,642,921 | Appleby | June 23, 1953 |
| 2,814,330 | Vanzo et al. | Nov. 26, 1957 |
| 2,814,331 | Vanzo et al. | Nov. 26, 1957 |